(12) United States Patent
Handley et al.

(10) Patent No.: US 11,619,442 B2
(45) Date of Patent: Apr. 4, 2023

(54) METHOD FOR REGENERATING A PRE-PURIFICATION VESSEL

(71) Applicants: James R. Handley, East Amherst, NY (US); Richard C. Cyganovich, North Tonawanda, NY (US); Cem E. Celik, Grand Island, NY (US); Brian S. Powell, Williamsville, NY (US); Devang Ashok Dasani, Buffalo, NY (US)

(72) Inventors: James R. Handley, East Amherst, NY (US); Richard C. Cyganovich, North Tonawanda, NY (US); Cem E. Celik, Grand Island, NY (US); Brian S. Powell, Williamsville, NY (US); Devang Ashok Dasani, Buffalo, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 226 days.

(21) Appl. No.: 17/234,100

(22) Filed: Apr. 19, 2021

(65) Prior Publication Data

US 2022/0333860 A1    Oct. 20, 2022

(51) Int. Cl.
*F25J 3/02* (2006.01)

(52) U.S. Cl.
CPC .......... *F25J 3/0295* (2013.01); *F25J 2290/80* (2013.01)

(58) Field of Classification Search
CPC .............................. F25J 3/0295; F25J 2290/80
USPC ........................................................... 62/77
See application file for complete search history.

(56) References Cited

U.S. PATENT DOCUMENTS

| 4,575,388 A | 3/1986 | Okada |
| 4,822,395 A | 4/1989 | Cheung |
| 5,069,698 A | 12/1991 | Cheung |
| 5,255,522 A | 10/1993 | Agrawal et al. |
| 5,355,681 A | 10/1994 | Xu |
| 5,440,884 A | 8/1995 | Bonaquist |

(Continued)

FOREIGN PATENT DOCUMENTS

| EP | 0826629 A2 | 3/1998 |
| EP | 2789376 A1 | 10/2014 |

OTHER PUBLICATIONS

Harry Cheung; "Moderate-pressure cryogenic air separation process"; Gas Separation & Purification; Mar. 1991; vol. 5; pp. 25-28.

*Primary Examiner* — Nael N Babaa
(74) *Attorney, Agent, or Firm* — Robert J. Hampsch

(57) ABSTRACT

A system and method of regenerating a pre-purification vessel is provided that is particularly suitable for pre-purification of a feed air stream in cryogenic air separation unit that uses an oxygen-enriched purge gas stream for regeneration of the pre-purification unit. The disclosed pre-purification systems and methods are configured to remove substantially all of the water, carbon dioxide and other impurities from a feed air stream, optionally including hydrogen and carbon monoxide impurities. The method of regenerating a pre-purification vessel preferably involves regenerating the pre-purification vessel with an oxygen-enriched purge gas after depressurization of the vessel and thereafter partially repressurizing the pre-purification vessel with an auxiliary purge gas thereby diluting the oxygen concentration of the gases contained in the pre-purification vessel and optionally depressurizing the partially repressurized vessel.

17 Claims, 2 Drawing Sheets

(56) References Cited

U.S. PATENT DOCUMENTS

| | | |
|---|---|---|
| 5,469,710 A | 11/1995 | Howard et al. |
| 5,722,259 A | 3/1998 | Sorensen et al. |
| 5,802,873 A | 9/1998 | Howard |
| 5,934,104 A | 8/1999 | Fidkowski et al. |
| 5,956,973 A | 9/1999 | Herron |
| 6,106,593 A | 8/2000 | Golden et al. |
| 6,173,586 B1 | 1/2001 | Bonaquist |
| 6,397,632 B1 | 6/2002 | Meagher |
| 2007/0209389 A1 | 9/2007 | Prosser |
| 2008/0000352 A1 | 1/2008 | Howard |
| 2008/0223077 A1 | 9/2008 | Prosser |
| 2009/0277220 A1 | 11/2009 | Howard |
| 2010/0037656 A1 | 2/2010 | Prosser |
| 2012/0011887 A1 | 1/2012 | Nakamura et al. |
| 2012/0036892 A1 | 2/2012 | Prosser |
| 2013/0312427 A1 | 11/2013 | Hashi et al. |
| 2014/0245782 A1 | 9/2014 | Howard |
| 2016/0025408 A1 | 1/2016 | Xu |
| 2017/0030638 A1 | 2/2017 | Prosser et al. |
| 2017/0030640 A1 | 2/2017 | Du et al. |
| 2017/0167788 A1 | 6/2017 | Pierre, Jr. et al. |
| 2019/0331416 A1 | 10/2019 | Prosser et al. |
| 2020/0149807 A1 | 5/2020 | Kromer et al. |

METHOD FOR REGENERATING A PRE-PURIFICATION VESSEL

TECHNICAL FIELD

The present invention relates to a system and method for regenerating a pre-purification vessel, and more particularly, to a method and system for regenerating a pre-purification vessel of an air separation unit where the regeneration purge gas is an oxygen-enriched purge gas.

BACKGROUND

Adsorption is well established technology for the purification of gases and for the treatment of fluid waste streams. Purification and separation of atmospheric air comprises one of the main areas in which adsorption methods are widely used. For an increase of their efficiency, novel and improved pre-purification systems and methods are continuously being developed.

One of the areas of strong commercial and technical interest represents pre-purification of air before its cryogenic distillation. Conventional air separation units for the production of nitrogen ($N_2$) and oxygen ($O_2$) and argon (Ar) by the cryogenic separation of air are basically comprised of two or at least three, respectively, integrated distillation columns which operate at very low temperatures. Due to these low temperatures, it is essential that water vapor ($H_2O$), and carbon dioxide ($CO_2$) is removed from the compressed air feed to an air separation unit. If not removed, water and carbon dioxide present in the feed air will freeze out and block heat exchangers employed for cooling the feed air prior to distillation in the cryogenic distillation columns. Preferably, to avoid freeze-out, the content of water in the compressed and pre-purified air feed stream must be less than 0.1 ppm (part per million) while the content of carbon dioxide in the compressed and pre-purified air feed stream must be less than 1.0 ppm. Removal of hydrocarbons and nitrous oxides is often required to ensure the safe operation of such cryogenic distillation systems that typically involve processing oxygen-enriched streams.

Current commercial methods for the pre-purification of the feed air may include temperature swing adsorption based units that employ layers of adsorbent materials together with optional catalytic pre-purification techniques. A pre-purification unit situated upstream of the cryogenic distillation system is typically used that includes an upfront adsorbent layer to remove water, carbon dioxide as well as hydrocarbons and other contaminants including oxides of nitrogen. Such pre-purification units may also optionally include one or more catalysts targeted to remove one or more contaminants followed by a final adsorbent layer downstream of the optional catalysts to remove the contaminants produced by the catalysis process. For example, some cryogenic air separation applications for the electronics industry and selected other industries require the removal of hydrogen and/or carbon monoxide from the feed air stream before processing the feed air stream in the cryogenic distillation system to produce a high purity or ultra-high purity nitrogen products.

The thermal regeneration process applied to such temperature swing adsorption based pre-purification units associated with an air separation unit acts to desorb the water, carbon dioxide and selected other contaminants such as hydrocarbons and nitrous oxide, from various layers in the pre-purifier units. Conventional thermal regeneration is preferably done using a multi-step process that involves at least four general steps, namely: (i) depressurizing the pre-purification vessel to a lower pressure suitable for regeneration process; (ii) heating the layers within the pre-purification vessel with a heated purge gas to desorb the water, carbon dioxide and other contaminants from various adsorption layers and cleanse the catalyst layers; (iii) cooling the layers within the pre-purification vessel with a cooler purge gas, often referred to as a cold purge gas, to temperatures suitable for the pre-purification process; and (iv) repressurizing the pre-purification vessel back to the higher operating pressures required for the pre-purification process. In conventional thermal regeneration of pre-purification vessels, the hot purge gas and cold purge gas typically comprise an air stream or a waste nitrogen-rich gaseous stream. However, the use of oxygen-enriched streams as the hot purge gas and cold purge gas has also been previously employed but requires special considerations for safety.

Safe operation of air separation units is of critical importance. Thus, when using an oxygen-enriched purge gas to regenerate the pre-purifier units associated with air separation units, special cleaning treatment or special materials may be required of some piping, vessels, valves and other equipment to ensure safe operation if such components are exposed to gas streams having high oxygen concentrations. Accordingly, it would be desirable to minimize the special cleaning/treatment and special material requirements (as well as the associated costs) by ensuring the oxygen content of the gas retained in a pre-purifier vessel after regeneration is diluted to ensure there is no plug of oxygen-enriched air flowing to the air separation unit cold box or to turbomachinery equipment upstream of the cold box when the pre-purification vessel cycles to the purification step. Thus, there is a continuing need to improve the regeneration of pre-purification units that use an oxygen-enriched purge gas to ensure the oxygen concentration of the gases in a repressurized pre-purification vessel is less than or equal to about 30% by molar volume, and more preferably less than or equal to about 26% by molar volume to ensure safe operation of the air separation unit and reduce the capital and operating costs associated with meeting the special design and handling requirements for components exposed to oxygen-enriched gases.

SUMMARY OF THE INVENTION

The present invention may broadly be characterized as a method of regenerating a pre-purification vessel, comprising the steps of: (i) depressurizing a pre-purification vessel to a regeneration pressure, the pre-purification vessel having one or more layers of adsorbent and/or layers of catalyst disposed therein; (ii) heating the one or more layers of adsorbent materials and/or one or more layers of catalyst materials disposed within the pre-purification vessel with a hot, oxygen-enriched purge gas to desorb the water and carbon dioxide from the one or more layers; (iii) cooling the one or more layers of adsorbent and/or layers of catalyst within the pre-purification vessel with a cold, oxygen-enriched purge gas; (iv) partially repressurizing the pre-purification vessel to an intermediate pressure with an auxiliary purge gas to dilute the oxygen concentration of the gases contained in the pre-purification vessel; and (v) fully repressurizing the pre-purification vessel to an operating pressure for pre-purification of a feed gas, wherein the oxygen concentration of the gases in the repressurized pre-purification vessel is less than or equal to about 30% by molar volume, and more preferably an oxygen concentration that is less than about 26% by molar volume.

In some embodiments, the step of partially repressurizing the pre-purification vessel further comprises partially repressurizing the pre-purification vessel the auxiliary purge gas and thereafter depressurizing the pre-purification vessel and releasing the auxiliary purge gas and any oxygen-enriched purge gas retained within the pre-purification vessel. In other embodiments, the step of partially repressurizing the pre-purification vessel further comprises partially repressurizing the pre-purification vessel with a nitrogen-rich gas having a nitrogen concentration at or above about 85% by molar volume to dilute the oxygen concentration of gases retained in the pre-purification vessel. The one or more layers of adsorbent within the pre-purification vessels preferably comprise activated alumina, silica gel, zeolite based molecular sieve, an X-type zeolite or combinations thereof while the one or more layers of containing layers within the pre-purification vessels include hopcalite catalyst or noble metal catalysts, such as a palladium on alumina oxide catalyst. The regeneration pressure is preferably less than about 6.0 bar and more preferably between about 1.0 bar and 2.0 bar while the operating pressure is typically greater than or equal to about 6.0 bar.

The hot, oxygen-enriched purge gas is preferably heated to a temperature of at least 150° C. using a heater while the cold, oxygen-enriched purge gas is at a temperature of less than or equal to about 50° C., both of which are preferably sourced from an oxygen-enriched stream from a distillation column system or a condenser of the air separation unit. The auxiliary purge gas is preferably air, such as a dry air stream taken from a location downstream of the pre-purifier unit or a diverted portion of feed air taken from a location upstream of the pre-purifier unit or even a synthetic air stream taken from the air separation unit. Alternatively, the auxiliary purge gas may be a nitrogen-rich gas taken from the air separation unit or a nitrogen storage tank located close by.

BRIEF DESCRIPTION OF THE DRAWINGS

While the specification concludes with one or more claims specifically pointing out the subject matter that Applicants regard as the invention, it is believed that the present systems and methods for pre-purification of a feed gas stream will be better understood when taken in connection with the accompanying drawing in which:

DETAILED DESCRIPTION

The present system and method for regenerating a pre-purification vessel is targeted for applications such as regenerating a pre-purification units associated with cryogenic air separation units, preferably with an oxygen-enriched purge gas stream.

Figure 1:
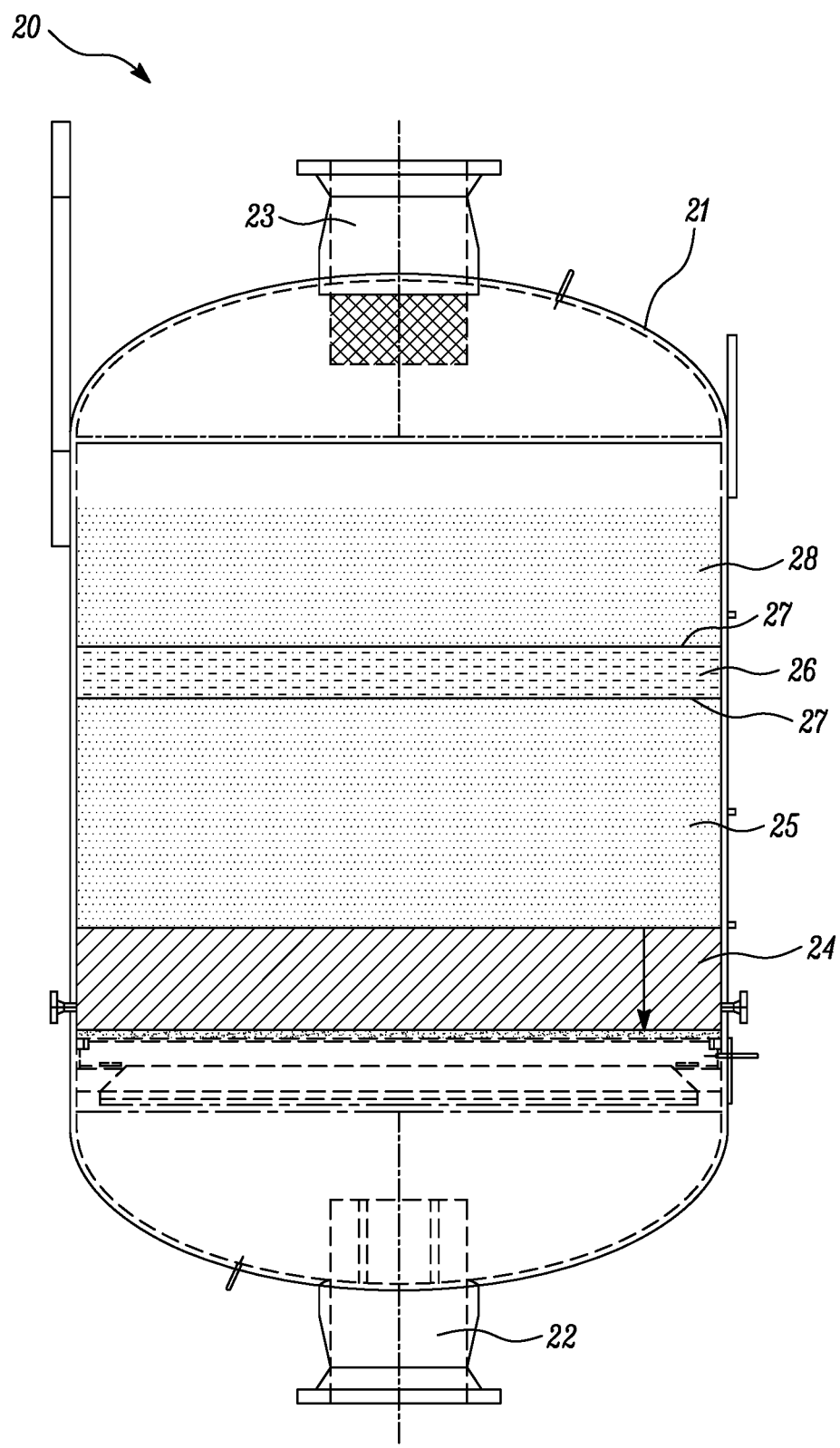
FIG. 1 is a schematic representation of a pre-purification vessel associated with an air separation unit, the pre-purification vessel shown having one or more adsorbent layers and/or catalyst layers.

Tuning now to FIG. 1, there is shown an embodiment of a pre-purification bed 20 suitable for use with the present system and method for pre-purification of a feed gas stream, such as air. When associated with an air separation unit, the present system and method for pre-purification of a feed gas stream preferably includes at least two pre-purification beds configured to purify a feed air stream received at the inlet 22 of a cylindrical vessel 21 housing a plurality of adsorption layers and/or catalyst layers and to deliver a purified air stream at outlet 23. Each of the at least two pre-purification vessels are also configured to regenerate the adsorption layers and catalyst layers contained within the pre-purification vessels using one or more oxygen-enriched purge gas streams. As is well known in the art, use of two or more pre-purification vessels in cryogenic air separation units allows continuous production of purified air that is subsequently separated is distillation columns within the cold box of the air separation units. When one or more of the pre-purification vessels is being used to purify the incoming feed air, one or more other pre-purification vessels are being regenerated, preferably using a process widely known as thermal regeneration. Each pre-purification vessel includes a plurality of layers, including one or more layers of adsorption materials such as activated alumina and/or zeolite based molecular sieves as well as one or more layers containing catalyst materials such as hopcalite and/or noble metal catalysts.

The pre-purification bed 20 depicted in FIG. 1 includes a first layer of alumina 24 and a second layer of a zeolite based molecular sieve 25 disposed within the cylindrical vessel 21, both of which are configured to purify the feed gas stream by adsorption of impurities such as water vapor, carbon dioxide hydrocarbons and nitrous oxide. A third layer 26 containing hopcalite, a catalyst material that oxidizes carbon monoxide to carbon dioxide and also adsorbs and/or converts hydrogen to water is disposed downstream of the initial adsorption layers 24, 25. Downstream of the hopcalite containing layer 26 is an optional zeolite based molecular sieve (not shown) that is configured to remove water and carbon dioxide from the gas stream exiting the hopcalite containing layer and an optional noble metal catalyst containing layer (not shown) such as a palladium on aluminum oxide catalyst (e.g. 0.5 wt % $Pd/Al_2O_3$) configured to oxidize most of the remaining hydrogen into water. A final capping layer 28 of zeolite based molecular sieve configured to adsorb the water vapor and carbon dioxide produced in the layers containing catalyst materials is also shown. A plurality of separation screens 27, such as a Monel separation screens, may also be installed between the various catalyst layers 26 and any adjacent adsorbent layers 25 and 28.

The present system and method is a modification or enhancement to the conventional process of thermally regenerating pre-purification vessels in a cryogenic air separation unit and is particularly suitable for pre-purifier applications that use an oxygen-enriched purge gas to regenerate the pre-purifier units. The present method adds one or more additional steps to the conventional thermal regeneration process and the present method is broadly characterized by the following steps: (i) depressurizing the pre-purification vessel to lower pressures suitable for pre-purifier regeneration; (ii) heating the adsorbent and catalyst layers within the pre-purification vessel with an oxygen-enriched, heated purge gas to desorb the water and carbon dioxide from various layers and regenerate the catalyst layers; (iii) cooling the adsorbent and catalyst layers within the pre-purification vessel with an oxygen-enriched, cold purge gas to temperatures suitable for the pre-purification process; (iv) partially repressurizing the pre-purification vessel with an auxiliary purge gas thereby diluting the oxygen concentration of the gases retained in the pre-purification vessel after the cooling step, as well as optionally depressurizing the partially repressurized vessel; and (v) fully repressurizing the prepurification vessel back to the higher operating pressures required for the pre-purification process, wherein the oxygen concentration of the gases in the fully repressurized pre-purification vessel is less than or equal to about 30% by molar volume, and more preferably, less than or equal to about 26% by molar volume.

Specifically, in the preferred embodiments, step (iv) of the above-identified process further comprises: (a) partially repressurizing the pre-purification vessel to a prescribed moderate pressure with an auxiliary purge gas having an oxygen concentration less than about 23%, preferably a clean dry air stream taken from a location downstream of the pre-purifier unit or alternatively a diverted portion of the feed air stream taken from a location upstream of the pre-purifier unit or even a synthetic air stream (e.g. a mixture of oxygen and nitrogen streams taken from the air separation unit); and (b) depressurizing the pre-purification vessel by releasing most of the auxiliary purge gas and any retained oxygen-enriched purge gas from within the pre-purification vessel. Alternatively, step (iv) may further comprise a single step of partially repressurizing the pre-purification vessel to a prescribed moderate pressure with a nitrogen-rich gas, preferably having a nitrogen concentration above 85% until the oxygen concentration in the pre-purification vessel is less than 30% by molar volume, and more preferably less than or equal to about 26% by molar volume.

The thermal regeneration of pre-purification vessels is preferably conducted at lower pressures such as 1.0 bar to 2.0 bar compared to the higher pressures maintained during the purification process and must be conducted at temperatures of at least 150° C., subject to appropriate safety requirements. The heating step in the thermal regeneration process is typically conducted by heating a purge gas to produce a stream of hot purge gas which is fed to vessel via outlet and which traverses the layers of the pre-purification vessel in reverse order compared to the pre-purification process. In many applications of the present method, the purge gas may be taken as a portion of the oxygen product gas from the distillation columns of the cryogenic air separation unit or from the oxygen-enriched boil-off or waste gas taken from the argon condenser. As the oxygen-enriched hot purge gas passes through the various layers of the pre-purification vessel, the catalyst layers and adsorbent layers are regenerated. The oxygen-enriched effluent purge gas exiting the pre-purification vessel via the inlet is typically vented. After the catalyst layers and adsorbent layers are heated and regenerated, the adsorbent and catalyst layers in pre-purification vessels are then cooled using a cold, oxygen-enriched purge gas generally at a temperature from about 10° C. up to 50° C. that flows through the pre-purification vessel in the same direction as the hot purge gas. After cooling, the oxygen concentration of the residual gases in the pre-purification vessel is diluted with an auxiliary purge gas and the pre-purification vessel repressurized to the higher operating pressures required by the pre-purification process.

The regeneration steps are conducted as described above for a predetermined period of time, typically referred to as the cycle time after which the service or functions of the pre-purification units are switched so that vessels previously regenerating come "on line' and initiates the purification process while vessels previously purifying the feed air go "off-line' and initiate the regeneration process. Typical pre-purification cycle times for high-purity or ultra-high purity nitrogen producing air separation plants is between about 360 minutes and 1200 minutes (i.e. total cycle time including blending, purification service, and regeneration service).

Each pre-purification unit alternates between purification service and regeneration service to maintain continuous production of purified air substantially free of carbon dioxide, water, carbon monoxide, hydrogen and other impurities.

The pre-purification vessels depicted in FIGS. are preferably dense loaded. Dense loading provides the most consistent and uniform packing of adsorbents and catalysts with minimal leveling of the layers required. Furthermore, dense packing minimizes adsorbent settling. Such dense packing for pre-purifiers designed for carbon monoxide and hydrogen removal is optional and may be utilized for all layers in the bed to ensure integrity and uniform depth. Because of relatively thin layers in second purification section for removal of carbon monoxide and hydrogen, including multiple layers of hopcalite and adsorbent layers, as well as any noble metal based catalyst that may be used, it is important to minimize the shifting and/or settling of the layers in order to maintain a uniform depth of the layers over the life of the pre-purifier unit.

Figure 2:
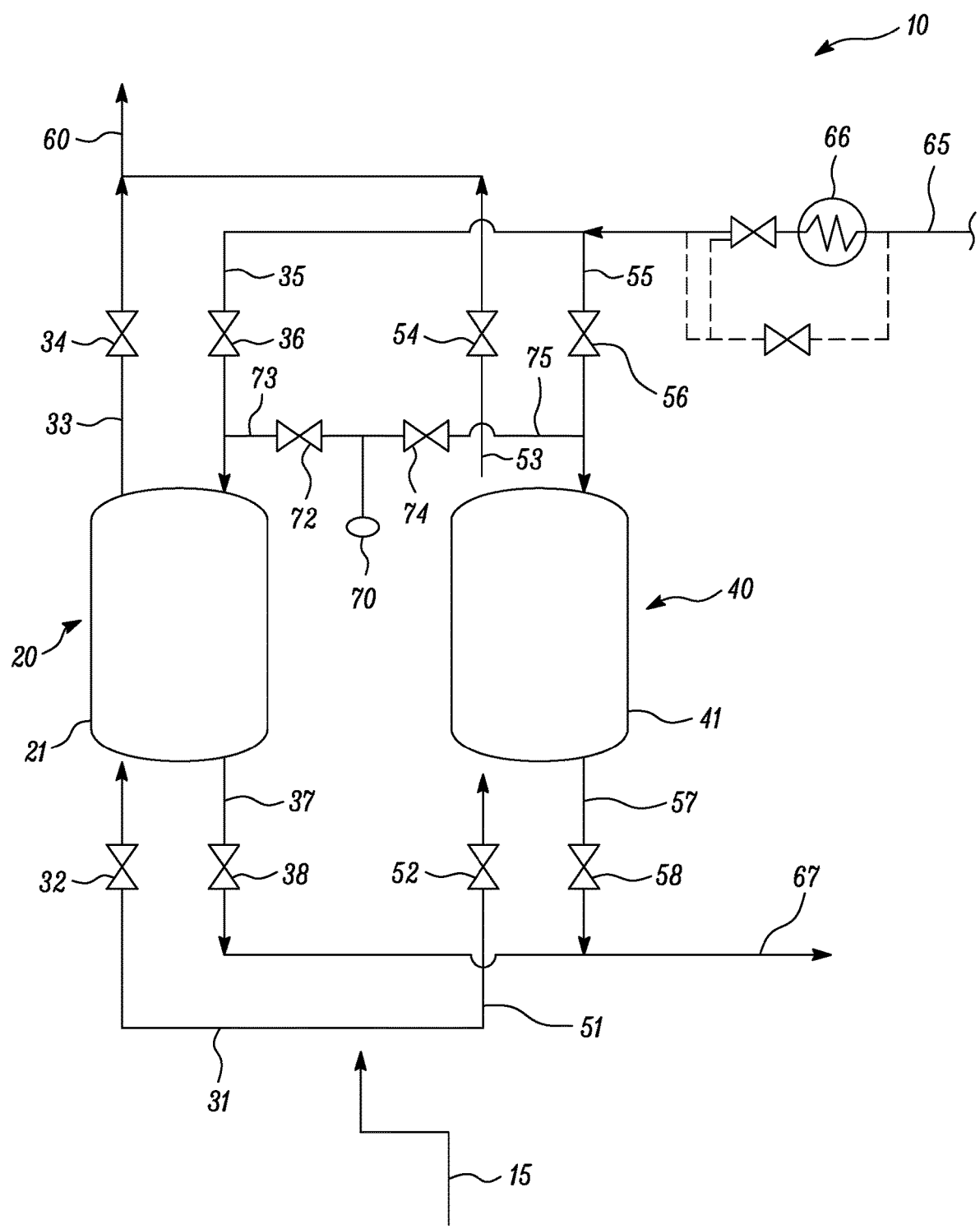
FIG. 2 is a schematic representation of a two-bed pre-purification unit configured for use with the present method for regenerating a pre-purification vessel and depicting the various of flow circuits and valves within the pre-purification unit.

Turning now to FIG. 2, a two bed temperature swing adsorption pre-purifier unit 10 is schematically illustrated. The two bed temperature swing adsorption pre-purifier unit 10 includes two parallel pre-purifier beds 20 and 40. Pre-purifier beds 20 and 40 each include a cylindrical vessel 21, 41 and a packed bed comprising a plurality of adsorbent layers and/or catalyst layers.

Compressed air stream 15 may be directed towards either of the parallel pre-purifier beds 20 and 40 by means of conduits via streams 31 and 51, respectively. Valves 32 and 52 control the flow of feed air entering the pre-purifier beds 20 and 40 and the pre-purified air is discharged from the pre-purifier beds 20 and 40 through conduits 33 and 53 that contain valves 34 and 54 to control the flow of streams of pre-purified air through the conduits 33 and 53. Both conduits 33 and 53 are connected to discharge the compressed and pre-purified air stream 60 which is directed to the cold box of the air separation unit.

As discussed in more detail below, an oxygen-enriched purge stream 65 is optionally heated by passing through a heat exchanger or electric heater 66 and enters the pre-purifier beds 20 and 40 through conduits 35 and 55. The oxygen-enriched purge stream regenerates the adsorbents contained in the pre-purification beds 20 and 40. The oxygen-enriched purge flow within conduits 35 and 55 is controlled by valves 36 and 56, respectively. A more or less continuous effluent stream laden with water vapor and carbon dioxide previously adsorbed within pre-purifier beds 20 and 40 as well as other impurities passes through conduits 37 and 57 and is discharged as a waste stream 67 which can be vented to atmosphere. Flow of the effluent streams within conduits 37 and 57 is controlled by valves 38 and 58, respectively.

For a temperature swing adsorption process conducted within two bed temperature swing adsorption pre-purifier, it is desirable to have a continuous flow of dry pre-purified feed air to enter the cold box of the associated air separation unit. This is done by using at least two pre-purifier beds 20 and 40 where at least one pre-purification bed is on-line and adsorbing or catalyzing the impurities in the air while at least one other pre-purification bed is off-line and being regenerated. The on-line pre-purification bed can only remain on-line until it reaches its capacity to adsorb the impurities and impurity breakthrough will occur. The breakthrough point is often defined by the time required for the contaminants, for instance, water vapor and carbon dioxide, to reach unacceptable levels at the outlet, suggesting the pre-purification bed is saturated with contaminants. Once the breakthrough point is reached, the on-line pre-purifier bed is brought off-line and the previously regenerated bed is brought back on-line to adsorb and/or catalyze the impurities.

In the present temperature swing adsorption process, there are generally up to eight steps in a full cycle, that each of the pre-purifier beds undergoes that are continuously repeated. The eight steps are namely 'Blend'; Purification'; 'Depressurization'; 'Hot Purge'; 'Cold Purge'; 'Partial Re-pressurization'; 'Partial De-pressurization', and 'Full Re-pressurization'. Table 1 below take in conjunction with FIG. 2 shows the correlation of the performance of the multiple steps within the pre-purification cycle using two pre-purifier beds 20 and 40 and an auxiliary purge gas of air, which are described in more detail in the paragraphs that follow.

Such regeneration is completed by way of five or six distinct steps including, in order: (i) 'Depressurization'; (ii) 'Hot Purge'; (iii) 'Cold Purge'; (iv) 'Partial Re-pressurization' with an auxiliary purge gas; (v) 'Partial De-Pressurization' (optional); and (vi) 'Full Re-pressurization' with air. During 'Depressurization', the pre-purifier bed 20 depressurizes from the operating pressure to a lower pressure referred to as regeneration pressure, less than about 6.0 bar and more preferably less than 2.0 bar and typically just above atmospheric pressure. This is accomplished by closing valves 32, 34 and 36 while opening valve 38. The 'Depressurization' typically lasts for about 15 minutes, although the duration of the 'Depressurization' step can vary depending on equipment constraints or process limitations. Once depressurized, a 'Hot Purge' step begins with heating an oxygen-enriched

TABLE 1

| | Bed #1 (20) | | | | | | Bed #2 (40) | | | | | |
| --- | --- | --- | --- | --- | --- | --- | --- | --- | --- | --- | --- | --- |
| Step | Min | Valve 32 | Valve 34 | Valve 36 | Valve 38 | Valve 72 | Step | Min | Valve 51 | Valve 54 | Valve 56 | Valve 58 | Valve 74 |
| Blend | 30 | open | open | close | close | close | Blend | 30 | open | open | close | close | close |
| Depress | 15 | close | close | close | open | close | Purify | 480 | open | open | close | close | close |
| Hot Purge | 163 | close | close | open | open | close | | | | | | | |
| Cold Purge | 272 | close | close | open | open | close | | | | | | | |
| Parital Repress | 6 | close | close | close | close | open | | | | | | | |
| Partial Depress | 9 | close | close | close | open | close | | | | | | | |
| Full Repress | 15 | close | close | close | close | open | | | | | | | |
| Purify | 480 | open | open | close | close | close | | | | | | | |
| | | | | | | | Depress | 15 | close | close | close | open | close |
| | | | | | | | Hot Purge | 163 | close | close | open | open | close |
| | | | | | | | Cold Purge | 272 | close | close | open | open | close |
| | | | | | | | Parital Repress | 6 | close | close | close | close | open |
| | | | | | | | Partial Depress | 9 | close | close | close | open | close |
| | | | | | | | Full Repress | 15 | close | close | close | close | open |
| Total | 990 | — | — | — | — | — | Total | 990 | — | — | — | — | — |

During the 'Blend' step, both pre-purification beds 20, 40 are "on-line" and valves 32, 34, 52 and 54 are opened while valves 36, 38, 56 and 58 are closed. The feed air stream 15 is split evenly between the two beds during this step with no regeneration gas 65 in the system. While on-line, the pre-purification beds 20 and 40 are adsorbing water vapor, carbon dioxide and other contaminants while any catalysts present would oxidize impurities such as carbon monoxide and hydrogen. The purpose of this 'Blend' step is to dilute the amount of residual heat left in the pre-purification beds during regeneration and further dilute the oxygen content of the resultant blended stream thus prevent a heated stream or an oxygen-enriched stream from being fed back to the cold box of the air separation unit.

Following the 'Blend' step of about 30 minutes, one of the pre-purifier beds 20 is subjected to depressurization or 'Depress' step and is going off-line while the other pre-purifier bed 40 receives the full feed flow and goes through the 'Purification' step where water vapor, carbon dioxide and other impurities, such as nitrous oxides, hydrocarbons, carbon monoxide, hydrogen are removed. The "off-line" pre-purification bed 20 is often said to undergo regeneration.

purge gas stream 65 using heater 66 to a temperature higher than the feed temperature and preferably of least 150° C., depending on the pre-purification process and material constraints and typically not higher than about 190° C. due to the higher concentration of oxygen in the purge gas stream. During this 'Hot Purge' step, valve 36 opens and allows the heated oxygen-enriched purge gas stream to pass through pre-purifier bed 20 through conduits 35 and 37.

After a certain time period elapses, in this example after 163 minutes, the oxygen-enriched purge gas stream bypasses heater 66 or the heater 66 is shut-off, lowering the oxygen-enriched purge gas stream temperature to close to ambient conditions and typically less than or equal to about 50° C. This starts the 'Cold Purge' step, which continues the purge with the oxygen-enriched stream 65 but without the heat. This 'Cold Purge' step lowers the temperature of the pre-purification bed 20 as well as advancing the heat front through the pre-purification bed. In this example, the 'Cold Purge' step lasts about 272 minutes.

The 'Partial Re-pressurization' step then occurs by closing valves 36 and 38 and opening valve 72 to introduce an auxiliary purge gas 70 via conduit 73 into the pre-purification bed 20 for a specified duration (e.g. 6-15 minutes) and/or to the pre-purification vessel 20 reaches an intermediate pressure that is between the regeneration pressure and the operating pressure. It is preferred to introduce the auxiliary purge gas to the pre-purification vessel at a location proximate the purge valves and the clean end of the pre-purification vessel (e.g. proximate vale 36, 56 and the outlet 23) and to remove the auxiliary purge gas and any retained oxygen-enriched purge gas from a location near the dirty end of the pre-purification vessel (e.g. proximate the inlet 23). This preferred placement ensures that there is no plug of oxygen-enriched gas at or near the purge valves or the clean end of the pre-purification vessel after the Full Re-pressurization step.

In embodiments that utilize clean dry air or synthetic air as the auxiliary purge gas 70, the partial Re-pressurization lasts for about 6 minutes and then the prepurification bed 20 is Partially Depressurized by opening valve 38 and closing valve 72, while keeping also valves 36, 34, and 32 closed for a duration of another 9 minutes. The Partial De-pressurization step concludes when the oxygen concentration in the pre-purifier bed is reduced to less than or equal to about 30% by molar volume, and more preferably less than or equal to about 26% by molar volume.

In embodiments that utilize a nitrogen stream as the auxiliary purge gas 70, the nitrogen stream preferably having a nitrogen concentration above 85% by molar volume, the Partial Re-pressurization step may last for up to 15 minutes. The Partial Re-pressurization step concludes when the oxygen concentration in the pre-purifier bed is reduced to less than or equal to about 30% by molar volume, and more preferably less than or equal to about 26% by molar volume.

The regeneration process then continues with a 'Full Re-pressurization' step by keeping valves 34 and 38 closed and opening either valve 72 or valve 32. If valve 32 is opened, this allows part of the compressed purified air stream 15 to pressurize the pre-purification bed 20 to full operating pressure. Alternatively, if the auxiliary purge gas is an air stream or synthetic air stream, valve 72 is opened to pressurize the pre-purification bed 20 back to full operating pressure. Once pressurized to the operating pressure, both pre-purification beds 20 and 40 enter the 'Blend' step and as such, valves 32, 34, 52 and 54 are fully open allowing the feed air stream 15 to be split evenly between pre-purification beds 20 and 40 and be purified. After a certain amount of time in the 'Blend' step, the pre-purification beds switch and pre-purification bed 20 is on-line in the 'Purification' step while pre-purification bed 40 goes through a sequence of regeneration steps as outlined above with reference to Table 1.

While the present system and method have been described with reference to a preferred embodiment or embodiments, it is understood that numerous additions, changes and omissions can be made without departing from the spirit and scope of the present invention as set forth in the appended claims. For example, the presently disclosed system and method are targeted for applications using thermal regeneration and thermal swing adsorption based pre-purification techniques, it is contemplated that the present system and methods could be adapted or further modified for use with pressure swing adsorption based pre-purification units and/or hybrid type pre-purifiers units that use both pressure swing adsorption based pre-purification and thermal swing adsorption based pre-purification techniques.

What is claimed is:

1. A method of regenerating a pre-purification vessel, comprising the steps of:
   (i) depressurizing a pre-purification vessel to a regeneration pressure, the pre-purification vessel having one or more layers of adsorbent and/or layers of catalyst disposed therein;
   (ii) heating the one or more layers of adsorbent materials and/or one or more layers of catalyst materials disposed within the pre-purification vessel with an oxygen-enriched purge gas to desorb the water and carbon dioxide from the one or more layers;
   (iii) cooling the one or more layers of adsorbent and/or layers of catalyst within the pre-purification vessel with another oxygen-enriched purge gas;
   (iv) partially repressurizing the pre-purification vessel with an auxiliary purge gas to dilute the oxygen concentration of the gases contained in the pre-purification vessel after the cooling step;
   (v) fully repressurizing the pre-purification vessel to an operating pressure for pre-purification of a feed gas, wherein the oxygen concentration of the gases in the repressurized pre-purification vessel is less than or equal to 30% by molar volume.

2. The method of claim 1 wherein the oxygen concentration of the gases in the repressurized pre-purification vessel is less than or equal to 26% by molar volume.

3. The method of claim 1 wherein the step of partially repressurizing the pre-purification vessel with the auxiliary purge gas further comprises partially repressurizing the pre-purification vessel to an intermediate pressure with the auxiliary purge gas; and thereafter depressurizing the pre-purification vessel and releasing the auxiliary purge gas and any oxygen-enriched purge gas retained within the pre-purification vessel.

4. The method of claim 1 wherein the step of partially repressurizing the pre-purification vessel with the auxiliary purge gas further comprises partially repressurizing the pre-purification vessel to an intermediate pressure with a nitrogen-rich gas having a nitrogen concentration above 85% by molar volume thereby diluting the oxygen concentration of gases retained in the pre-purification vessel.

5. The method of claim 1 wherein the oxygen-enriched purge gas has a temperature of at least 150° C.

6. The method of claim 1 wherein the another oxygen-enriched purge gas has a temperature of at less than or equal to 50° C.

7. The method of claim 1 wherein the pre-purification vessel is coupled to an air separation unit and the feed gas is air, wherein the one or more layers of adsorbent within the pre-purification vessels comprise activated alumina, silica gel, zeolite based molecular sieve, an X-type zeolite or combinations thereof and are configured to remove impurities, including water, carbon dioxide and other contaminants in the feed gas.

8. The method of claim 7 wherein the one or more layers of catalysts within the pre-purification vessels comprise hopcalite or noble metal catalysts and are configured to remove impurities, including hydrogen and carbon monoxide.

9. The method of claim 1 wherein the pre-purification vessel is coupled to an air separation unit and the oxygen-enriched purge gas and the another oxygen-enriched purge gas are taken from an oxygen-enriched stream from a distillation column system of the air separation unit.

10. The method of claim 9 wherein the step of heating the one or more layers of adsorbent materials and/or one or more layers of catalyst materials with the oxygen-enriched purge gas further comprises heating the oxygen-enriched stream using an electric, gas-fired or steam heater.

11. The method of claim 1 wherein the pre-purification vessel is coupled to an argon producing air separation unit and the oxygen-enriched purge gas and the the another oxygen-enriched purge gas are oxygen-enriched streams taken from an argon condenser associated with the argon producing air separation unit.

12. The method of claim 3 wherein the regeneration pressure is less than 6.0 bar; the operating pressure is greater than or equal to 6.0 bar; and the intermediate pressure is between the regeneration pressure and the operating pressure.

13. The method of claim 3 wherein the pre-purification vessel is coupled to an air separation unit and the auxiliary purge gas further comprises a dry air stream taken from a location downstream of the pre-purifier vessel associated with the air separation unit, or a diverted portion of feed air taken from a location upstream of the pre-purifier unit associated with the air separation unit, or a synthetic air stream taken from the air separation unit.

14. The method of claim 3 wherein the auxiliary purge gas is introduced to the pre-purification vessel via an auxiliary purge control valve and the release of the auxiliary purge gas and any retained gases from the pre-purification vessel during depressurization occurs via a partial depressurization control valve or the depressurization control valve.

15. The method of claim 4 wherein the pre-purification vessel is coupled to an air separation unit and the nitrogen-rich stream is taken from the air separation unit or a nitrogen storage tank.

16. The method of claim 4 wherein nitrogen-rich gas is introduced to the pre-purification vessel via an auxiliary purge gas control valve.

17. The method of claim 4 wherein the regeneration pressure is less than 6.0 bar; the operating pressure is greater than or equal to 6.0 bar; and the intermediate pressure is between the regeneration pressure and the operating pressure.

* * * * *